No. 619,999. Patented Feb. 21, 1899.
H. A. SHERMAN.
TENSION DEVICE FOR SHEARS.
(Application filed Dec. 6, 1898.)
(No Model.)
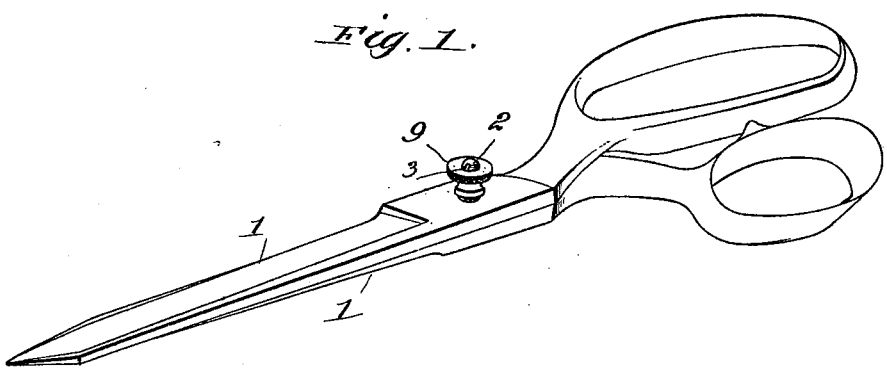
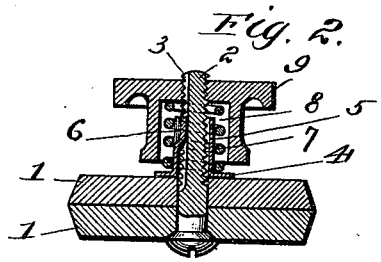
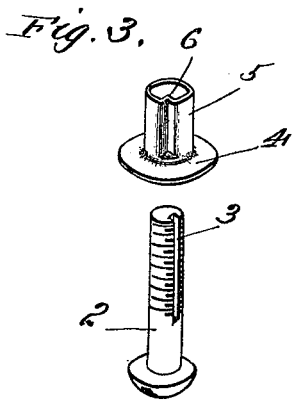
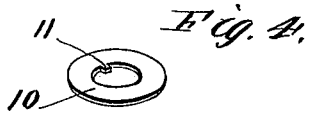
Witnesses
Inventor
H. A. Sherman
By Davis & Davis
Attorneys

UNITED STATES PATENT OFFICE.

HENRY A. SHERMAN, OF FREMONT, OHIO.

TENSION DEVICE FOR SHEARS.

SPECIFICATION forming part of Letters Patent No. 619,999, dated February 21, 1899.

Application filed December 6, 1898. Serial No. 698,467. (No model.)

*To all whom it may concern:*

Be it known that I, HENRY A. SHERMAN, a citizen of the United States, residing at Fremont, in the county of Sandusky and State of Ohio, have invented certain new and useful Improvements in Tension Devices for Shears, of which the following is a specification, reference being had therein to the accompanying drawings, in which—

Figure 1 is a perspective view of a pair of shears. Fig. 2 is a vertical sectional view, and Figs. 3 and 4 are detail perspective views of parts of the device.

The object of the invention is to provide a simple device by means of which the pressure of the cutting edges of the blades against each other may be readily regulated; and it consists in the novel combination and arrangement of parts hereinafter described.

Referring to the parts by numerals, 1 designates the blades of a shears of ordinary construction, which are connected together by the pivot-bolt 2. This bolt is grooved longitudinally, as at 3, and fitting it is a washer 4, formed with a tubular extension 5. This tubular extension of the washer is formed with an inwardly-projecting rib 6, which enters the groove 2 of the pivot-bolt. Surrounding the bolt and bearing at one of its ends on the washer 4 is a coil-spring 7, whose other end fits within the socket 8, formed in the cap 9, which screws down on the pivot-bolt 2. This cap receives almost the entire length of the spring 7, so that said spring is almost entirely hidden and protected. From this construction it will be seen that by screwing the cap down or by unscrewing the cap the pressure of the cutting edges of the blades against each other may be readily regulated by the person using the shears. It will also be noted that by means of the grooved pivot-bolt and the washer having the tubular extension formed with the rib which enters the groove of the pivot-bolt the vibration of the cutting-blades will not loosen the screw-cap.

The only parts of the device bearing on the shear-blades are the washer and the bolt, and as these parts are locked together by the rib and groove it is manifest that these parts must rotate together.

As the spring and screw-cap are carried by the pivot-bolt and washer it is evident that if there is any movement of the pivot-bolt or the washer the entire device will rotate. It will therefore be understood that if the entire tension device rotates the screw-cap will not be rotated on the pivot-bolt and the tension will not be changed.

Instead of employing a washer formed with the ribbed tubular extension, as shown in Figs. 2 and 3, a flat washer 10, formed with an inwardly-extending lug 11, which is adapted to enter the groove in the pivot-bolt, may be employed. It will thus be seen that the device is simple, easily adjusted, and when adjusted will remain in its adjusted position while in use.

Having thus fully described my invention, what I claim, and desire to secure by Letters Patent, is—

1. In a tension device for shears the combination of the shear-blades, a longitudinally-grooved pivot-bolt therefor, a washer surrounding said pivot-bolt and formed with a rib adapted to enter the groove in the pivot-bolt, and means carried by the pivot-bolt for yieldingly pressing said washer against one of the shear-blades.

2. In a tension device for shears the combination of the shear-blades, a longitudinally-grooved pivot-bolt therefor, a washer surrounding said pivot-bolt and formed with a rib adapted to enter the groove in the bolt, a spring surrounding the bolt and bearing on the washer, and a screw-cap adapted to regulate the pressure of the spring against the washer.

3. In a tension device for shears the combination of the shear-blades, a longitudinally-grooved pivot-bolt therefor, a washer surrounding said pivot-bolt and formed with a rib adapted to enter the groove in the bolt, a spring surrounding the bolt and bearing on the washer, and a screw-cap adapted to fit the pivot-bolt, and formed with a socket to receive the spring, said spring being adapted to regulate the pressure of the spring on the washer.

In testimony whereof I hereunto affix my signature, in the presence of two witnesses, this 30th day of November, 1898.

HENRY A. SHERMAN.

Witnesses:
J. M. HALL,
F. E. SEAGER.